United States Patent [19]

Bartkoski

[11] Patent Number: 4,982,057
[45] Date of Patent: Jan. 1, 1991

[54] BATWING FOR A SHUTTLE CAR

[75] Inventor: Mark A. Bartkoski, Providence, Ky.

[73] Assignee: Pyro Mining Company, Sturgis, Ky.

[21] Appl. No.: 405,030

[22] Filed: Sep. 11, 1989

[51] Int. Cl.⁵ .................... H02G 11/00; B65H 75/42
[52] U.S. Cl. ............................. 191/12 R; 242/86.51
[58] Field of Search ................ 191/1 R, 12 R, 12.2 R,
  191/12.2 A; 226/190, 194; 242/86.51

[56]  References Cited
  U.S. PATENT DOCUMENTS

| | | | |
|---|---|---|---|
| 2,458,573 | 1/1949 | Donahue | 191/12 R X |
| 2,472,860 | 6/1949 | Russell | 191/12.2 A |
| 2,483,760 | 10/1949 | Duncan | 191/12 R X |
| 2,589,235 | 3/1952 | Dudley | 242/86.51 |
| 3,022,023 | 2/1962 | Warf | 242/86.51 |
| 3,061,233 | 10/1962 | Dudley | 242/86.51 |
| 3,140,063 | 7/1964 | Bucklen | 242/86.51 |
| 3,990,551 | 11/1976 | Jamison et al. | 191/12 R |
| 4,569,489 | 2/1986 | Frey et al. | 242/86.51 |

Primary Examiner—Frank E. Werner
Assistant Examiner—Scott L. Lowe

[57] ABSTRACT

A bat wing for a shuttle car includes a top plate, a lower plate and at least one shieve wheel positioned between the top plate and the lower plate for spacing the top plate a predetermined distance from the lower plate. The lower plate includes at least a first edge, second edge and third edge substantially contiguous to each other and forming the lower plate having a predetermined area. The first and second edges of the lower plate forming a lower edge spaced a predetermined distance from the at least one shieve wheel. The top plate includes at least a first edge, second edge and third edge substantially contiguous to each other and forming the top plate having a predetermined area being greater than the predetermined area of the lower plate. The first and second edges of the top plate forming a top edge spaced a predetermined distance from the at least one shieve wheel and extending outwardly therefrom a distance greater than the predetermined distance of the lower edge from the at least one shieve wheel. An insulation member is disposed on the top and lower plates for reducing cable arcing and abrasive damage as a cable passes between the top and lower plates.

9 Claims, 5 Drawing Sheets

BATWING FOR A SHUTTLE CAR

BACKGROUND OF THE INVENTION

1. Field of the Invention

The present invention is directed to a batwing for a shuttle car wherein a top plate and a lower plate are spaced apart by at least one shieve wheel and are insulated to prevent cable arcing and abrasive damage as a cable passes between the top and lower plates.

2. Description of Background Art

Electrically powered vehicles require a cable to connect the vehicle to a power source. Historically, a batwing has been provided to guide the cable as it is released from or rewound onto a cable reel affixed to the electrically powered car.

An electrical cable utilized to supply power to an electric vehicle includes an insulating layer of material disposed around the electrically conductive wires. From time to time, the insulation disposed around the electrical wires is nicked to damage the insulation and expose small portions of the electrical wiring. The small nicks in the insulation cause an arcing between the electric cable and in the metallic batwing as the cable is discharged from or recoiled onto the cable reel. In addition, pitting of the surface of the metallic batwing occurs where the electric arcing takes place. Thus, additional insulation disposed along the length of the cable has a tendency to further deteriorate as the cable is pulled across the sharp jagged edges of the metallic batwing which has been pitted.

In addition, electrically powered vehicles utilized within a mine occasionally encounter plastic curtains which are utilized within the mine for directing air. Conventional metallic batwings have a tendency to permit the plastic curtains to enter into the space between the top plate and lower plate, thus causing a jamming and damage to the plastic curtains as they encounter the cable passing along the shieves disposed within the batwing.

SUMMARY AND OBJECTS OF THE PRESENT INVENTION

It is an object of the present invention to provide a batwing for a shuttle car wherein a top plate and a lower plate are insulated for reducing cable arcing and abrasive damage as a cable passes between the top and lower plates.

A further object of the present invention is to provide a top plate which has a larger surface area relative to the lower plate, thus preventing plastic curtains from entering into the space disposed between the top plate and lower plate.

A still further object of the present invention is to provide a batwing wherein the insulation has a predetermined thickness and a shieve wheel disposed between a top plate and lower plate is recessed into the thickness of the insulation to ensure the movement of the cable between the top and lower plates.

A further object of the present invention is to provide at least one shieve wheel which is rotatably mounted between the top and lower plates to assist in guiding the cable as it is discharged from or recoiled onto a cable reel.

These and other objects of the present invention are achieved by a batwing for a shuttle car which includes a top plate and a lower plate. At least one shieve wheel is positioned between the top plate and the lower plate for spacing the top plate a predetermined distance from the lower plate. The lower plate includes a first edge, second edge and third edge substantially contiguous to each other and forming the top plate having a predetermined area which is greater than the predetermined area of the lower plate. The first and second edges of the top plate form a top edge spaced a predetermined distance from the at least one shieve wheel and extending outwardly therefrom a distance greater than the predetermined distance of the lower edge from the at least one shieve wheel. Insulation is disposed on the top and lower plates for reducing cable arcing and abrasive damage as a cable passes between the top and lower plates.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
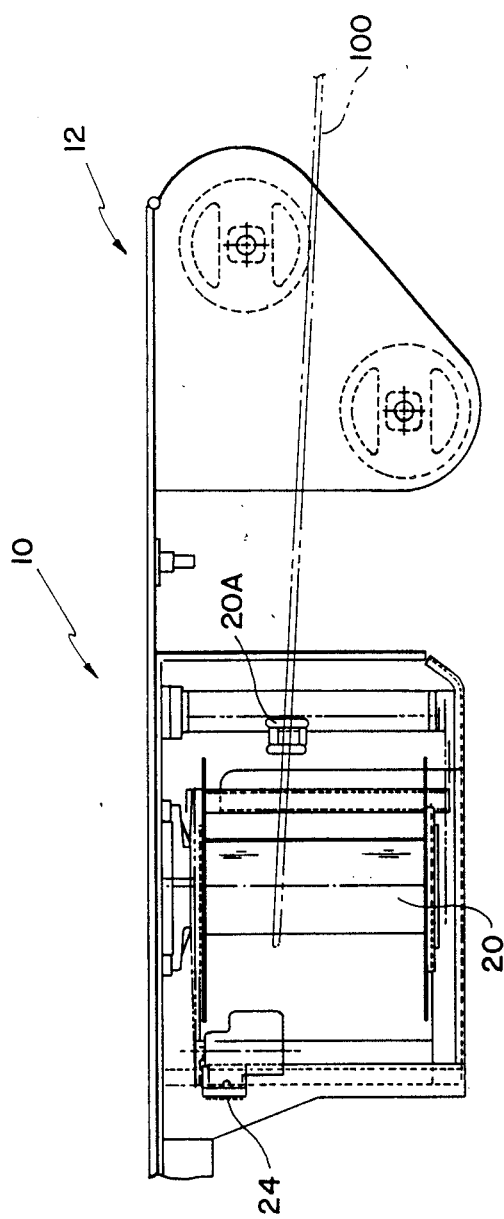
FIG. 1 is a top plan view of a batwing connected to a cable reel of a shuttle car.
Figure 2:
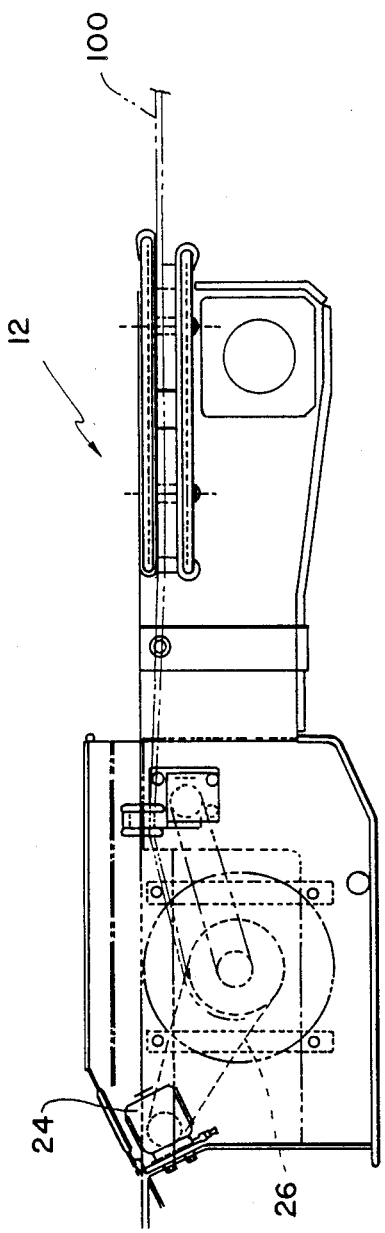
FIG. 2 is a partial cross-sectional view illustrating the batwing connected to the cable reel.

As illustrated in FIGS. 1 and 2, a shuttle car 10 is partially illustrated and includes a cable reel 20 operatively connected to a portion of the electric shuttle car. The cable reel 20 is designed to contain a predetermined length of electrical cabling 100 for connecting the electric shuttle car to a power source. As a shuttle car leaves the power source and enters into a mine, the electric cable 100 is permitted to discharge from the cable reel 20 over a cable guide 20A and through a batwing 12 to ensure that the electric cable 100 is easily discharged from the cable reel 20 to connect the electric shuttle car 10 to the power source. A motor 24 is connected to the cable reel 20 by means of a drive chain and sprocket 26. The motor 24 is synchronized with the movement of the electric shuttle car 10. Thus, as the electric shuttle car 10 moves away from the power source, the motor 24 permits the electric cable 100 disposed on the cable reel 20 to be discharged at a predetermined speed which is synchronized with the speed of the electric shuttle car 10. Similarly, when the electric shuttle car 10 returns towards the power source, the motor 24 is operated to permit the electric cable 100 to be guided over the cable guide 20A back onto the cable reel 20.

As illustrated in FIGS. 3-6, the batwing 12 includes a top plate 31 and a lower plate 32. The top plate 31 is spaced a predetermined distance from the lower plate 32 by means of at least one shieve wheel 60. In a preferred embodiment, at least two shieve wheels 60, 61 are provided to space the top plate 31 relative to the lower plate 32. The shieve wheels 60, 61 are rotatably mounted relative to the top plate 31 and lower plate 32 on the axles 60A, 61A, respectively. The axle 60A includes a head portion 60B. A bolt 60C is threaded onto a lower end of the axle 60A. A top cover 33 is affixed to the top plate 31 by means of bolts 33A. Similarly, a lower cover 34 is secured to the lower plate 32 by means of bolts 34A.

The shieve wheel 61 is rotatably mounted on the axle 61A. The axle 61A includes a head portion 61B. A nut 61C is threadedly mounted on the lower end of the axle 61A. A cover 35 is secured to the top plate 31 by means of bolts 35A. Similarly, a cover 36 is affixed to the lower plate 32 by means of bolts 36A. An enlarged projection 52 is secured to an outer edge of the lower plate 32. Insulation means 52A is mounted around the enlarged projection 52. In addition, insulation 41, 42 is secured to the surface of the top plate 31 and the lower plate 32, respectively. A bumper 51 is mounted on an outer edge of the top plate 31.

Figure 3:
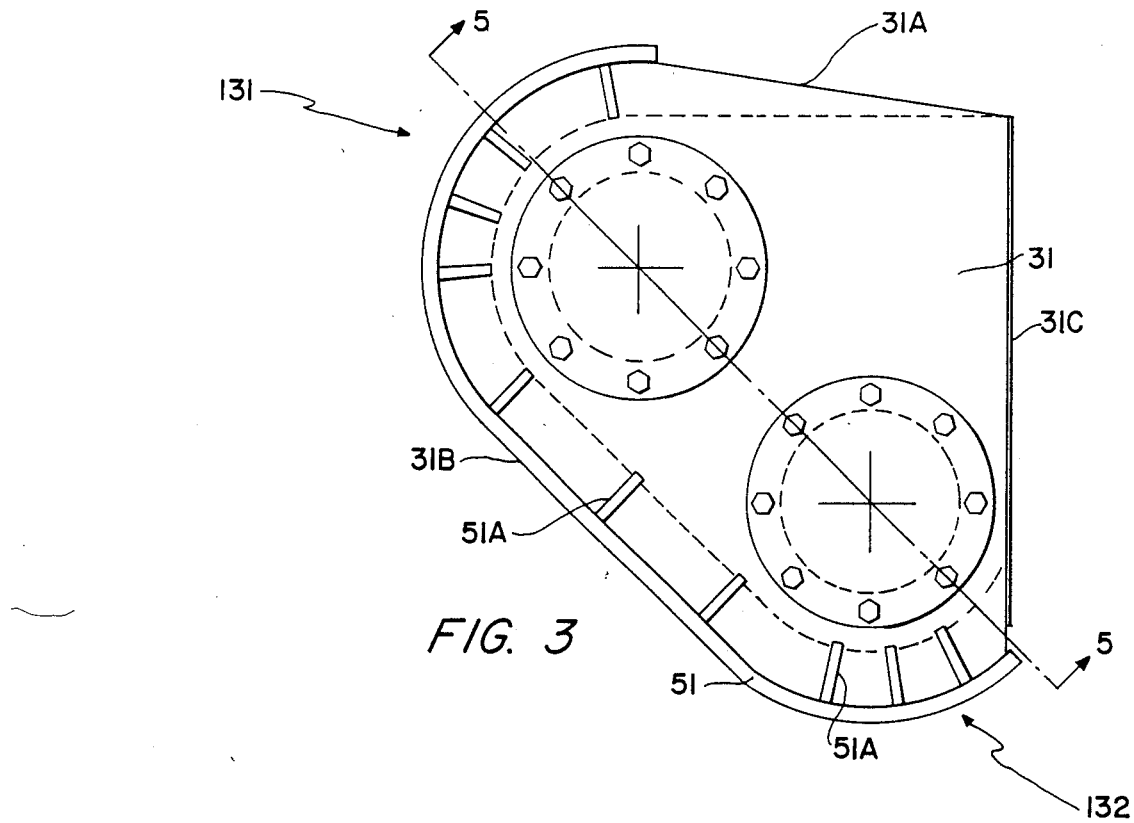
FIG. 3 is a top plan view of the batwing showing the shieve wheels in broken lines disposed beneath the top plate.

As illustrated in FIG. 3, the top plate 31 includes a first edge 31A, a second edge 31B and a third edge 31C. A rounded portion 131 is disposed between the first edge 31A and the second edge 31B. A rounded portion 132 is disposed between the second edge 31B and the third edge 31C. The first edge 31A, the second edge 31B and the third edge 31C are substantially contiguous to each other and form the top plate having a predetermined area. The predetermined area of the top plate 31 is larger than the area of the lower plate 32. The bumper 51 is secured to the rounded portion 132, the second edge 31B, the rounded portion 131 and a portion of the first edge 31A. The bumper 51 is mounted relative to the top plate 31 by means of gussets 51A which secure the bumper 51 relative to the top plate 31.

Figure 4:
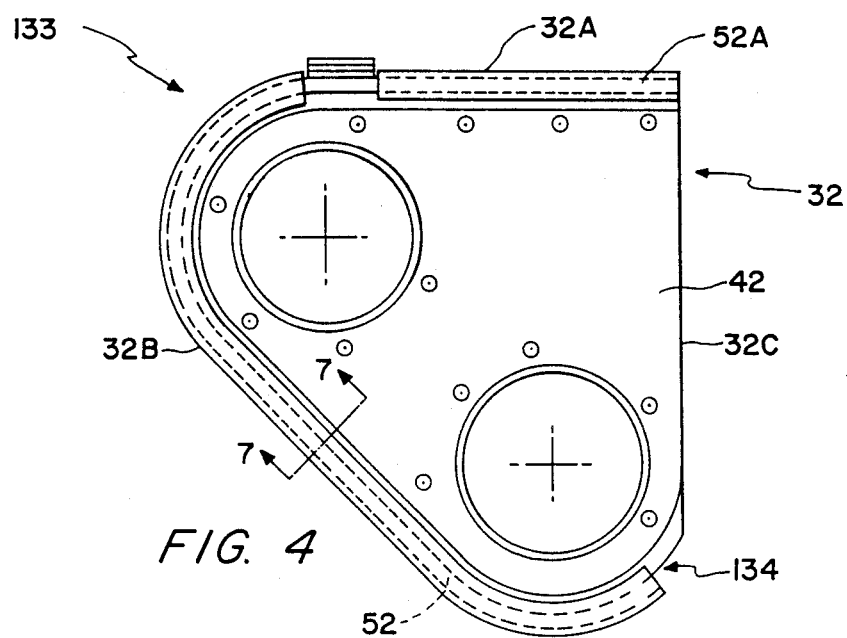
FIG. 4 is a top plan view of the bottom plate of the batwing.

As illustrated in FIG. 4, the lower plate 32 includes a layer of insulation 42 disposed on a surface thereof. A first edge 32A, a second edge 32B and a third edge 32C are substantially contiguous to each other and form the lower plate 32 having a predetermined area. The area of the lower plate 32 is smaller than the area of the top plate 31. A rounded portion 133 connects the first edge 32A to the second edge 32B. A rounded portion 134 connects the second edge 32B to the third edge 32C.

Figure 5:
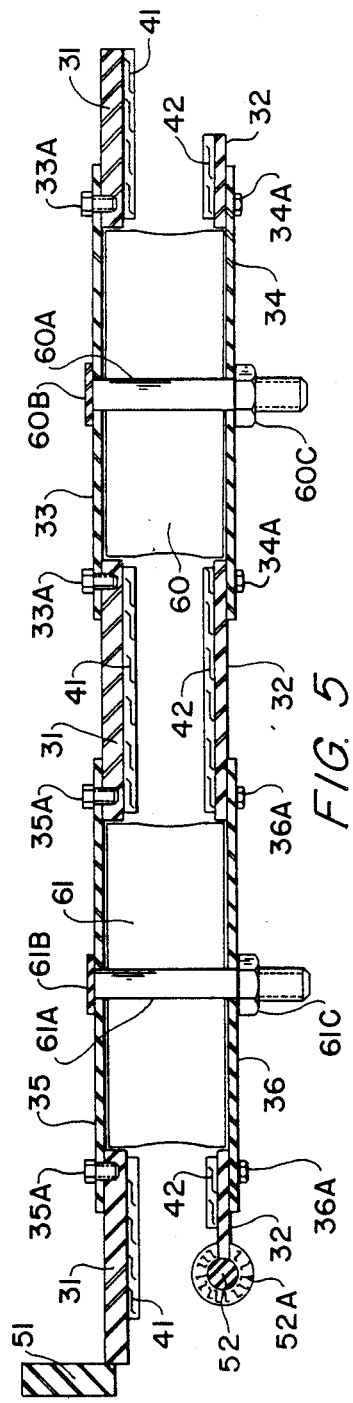
FIG. 5 is a cross-sectional view taken along line 5—5 of FIG. 3.
Figure 7:
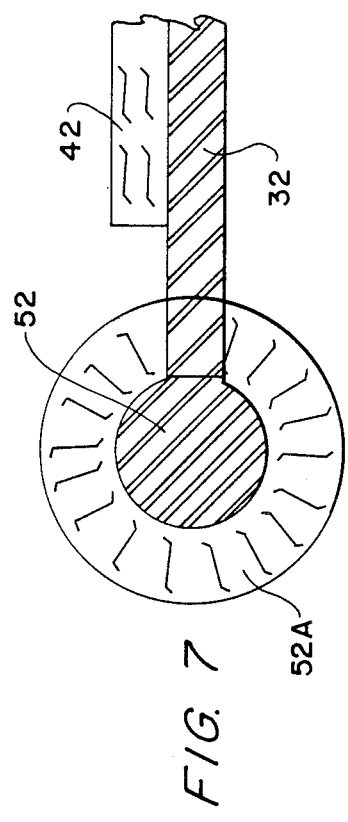
FIG. 7 is an enlarged cross-sectional view taken along line 7—7 as illustrated in FIG. 4.
Figure 6:
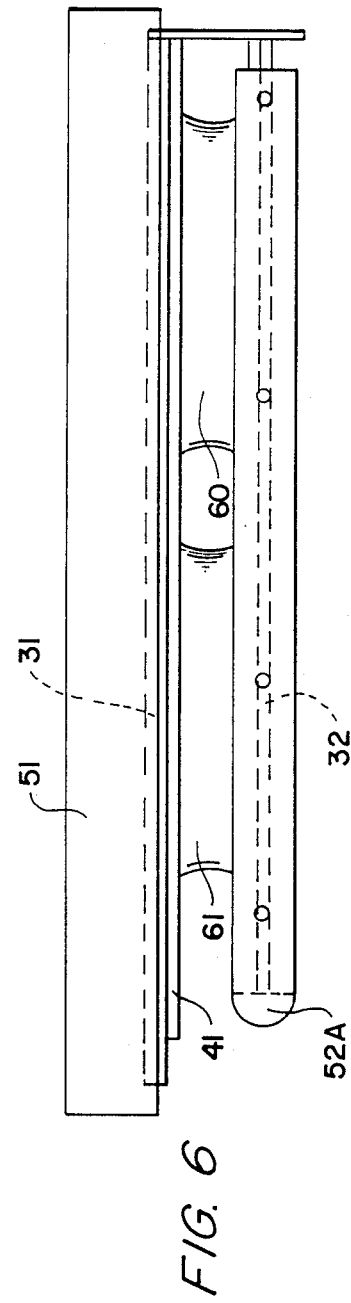
FIG. 6 is a side elevational view of the batwing illustrated in FIG. 1.

As illustrated in FIGS. 5 and 7, an enlarged portion 52 is connected to a portion of the rounded edge 134, the second edge 32B, the rounded edge 133 and the first edge 32A. The enlarged projection is covered with a layer of insulation 52A.

In operation, as the electric shuttle car 10 is moved relative to a power source, the electric cable 100 is released from or reeled onto the cable reel 20. The electric cable 100 is guided by means of the cable guide 20A over and through the batwing 12. The electric cable will engage at least one of the shieve wheels 60, 61 and will be disposed between the top plate 31 and the lower plate 32.

Insulation 41, 42 disposed between the top plate 31 and the lower plate 32 prevents electric arcing which may be caused by nicks in the electrical cable 100 as it passes between the top plate 31 and the lower plate 32. The insulation 41, 42 also prevents pitting of the surface of the top plate 31 and the lower plate 32, thus eliminating the possibility of further damage to the electrical cable 100 as it is discharged from or reeled onto the cable reel 20. The shieve wheels 60, 61 are rotatably mounted between the top plate 31 and the lower plate 32 to ensure the stable discharge or retrieval of the electrical cable 100.

The top plate 31 includes the bumper 51 and extends out a predetermined distance relative to the lower plate 32. In this way, as the electric shuttle car 10 moves through a mine and engages plastic curtains which are utilized to direct air movement, the plastic curtains are guided away from the batwing 12 and do not enter into the space between the top plate 31 and the lower plate 32. The enlarged projection 52 also is utilized to assist in the guiding of the cable 100 as it is discharged from or reeled onto the cable reel 20.

The insulation of the batwing 12 reduces the poor grounding in a DC shuttle car. Both insulation 41, 42 and insulation means 52A may be constructed of urethane. In addition, the shieve wheels 60, 61 are recessed into the thickness of the insulation 41, 42 to eliminate the possibility of the cable 100 from being hung under the shieve wheels 60, 61. In addition, recessing the shieve wheels 60, 61 into the thickness of the insulation 41, 42 reduces the effect of the cable being hung under the shieve wheels if the batwing is spread.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bat wing for a shuttle car comprising:
    a top plate;
    a lower plate;
    at least one shieve wheel positioned between said top plate and said lower plate for spacing said top plate a predetermined distance from said lower plate;
    said lower plate having at least a first edge, second edge and third edge substantially contiguous to each other and forming said lower plate having a predetermined area, said first and second edges of said lower plate forming a lower edge spaced a predetermined distance from said at least one shieve wheel;
    said top plate having at least a first edge, second edge and third edge substantially contiguous to each other and forming said top plate having a predetermined area being greater than the predetermined area of said lower plate, said first and second edges of said top plate forming a top edge spaced a predetermined distance from said at least one shieve wheel and extending outwardly therefrom a distance greater than the predetermined distance of said lower edge from said at least one shieve wheel;
    insulation means disposed on said top and lower plates for reducing cable arcing and abrasive damage as a cable passes between said top and lower plates.

2. A bat wing according to claim 1, and further including a bumper disposed on an upper surface of said top plate for preventing foreign objects from entering into the space between the top and lower plates.

3. A bat wing according to claim 1, wherein at least two shieve wheels are provided between said top and lower plates for guiding a cable passing therebetween.

4. A bat wing according to claim 3, wherein said two shieve wheels are rotatably mounted relative to said top and lower plates.

5. A bat wing according to claim 1, wherein said insulation means has a predetermined thickness and a top and lower surface of said shieve wheel are recessed into the thickness of said insulation means.

6. A bat wing according to claim 1, wherein said at least one shieve wheel is rotatably mounted relative to said top and lower plates.

7. A bat wing according to claim 1, and further including an enlarged projection positioned on said lower edge for preventing foreign objects from entering into the space between the top and lower plates.

8. A bat wing according to claim 7, wherein said enlarged projection is covered with a urethane liner.

9. A bat wing according to claim 1, wherein said insulation means is a urethane plate.

* * * * *